(12) United States Patent
Gardes et al.

(10) Patent No.: US 10,901,681 B1
(45) Date of Patent: Jan. 26, 2021

(54) VISUAL AUDIO CONTROL

(71) Applicant: Cisco Technology, Inc., San Jose, CA (US)

(72) Inventors: Laurent Gardes, Meudon (FR); Yann Joel Prat, Elancourt (FR); Olivier Lacour, Paris (FR); Berangere Lallemant, Paris (FR); Celine Houplain-Dufour, Paris (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 254 days.

(21) Appl. No.: 15/295,504

(22) Filed: Oct. 17, 2016

(51) Int. Cl.
   *G06F 3/16* (2006.01)
   *G06F 3/0488* (2013.01)
   *G06F 3/0484* (2013.01)

(52) U.S. Cl.
   CPC ............ *G06F 3/162* (2013.01); *G06F 3/0488* (2013.01); *G06F 3/04842* (2013.01); *G06F 3/04845* (2013.01); *G06F 3/04847* (2013.01); *G06F 3/165* (2013.01)

(58) Field of Classification Search
   CPC ...... G06F 3/162; G06F 3/04842; G06F 3/165; G06F 3/04847; G06F 3/0488; G06F 3/04845
   See application file for complete search history.

(56) References Cited

U.S. PATENT DOCUMENTS

| | | | | |
|---|---|---|---|---|
| 6,009,519 A * | 12/1999 | Jones | ............... | G06F 9/4411 713/1 |
| 7,123,731 B2 * | 10/2006 | Cohen | ............... | H04S 7/301 381/303 |
| 7,676,044 B2 * | 3/2010 | Sasaki | ............... | H04S 7/302 381/303 |
| 2003/0103075 A1 * | 6/2003 | Rosselot | ............... | H04L 41/22 715/717 |
| 2004/0228498 A1 * | 11/2004 | Sekine | ............... | H04S 7/30 381/303 |
| 2007/0297459 A1 * | 12/2007 | Cucos | ............... | H04J 3/07 370/505 |
| 2008/0232617 A1 * | 9/2008 | Goodwin | ............... | G10L 19/008 381/307 |
| 2010/0097441 A1 * | 4/2010 | Trachtenberg | ............... | H04N 7/142 348/14.08 |

(Continued)

OTHER PUBLICATIONS

Mann et al., "Object-Based Audio Applied to Football Broadcasts—The 5 live Football Experiment", Nov. 2013, British Broadcasting Corporation, BBC Research & Development White Paper WHP 272, 20 pages (Year: 2013).*

*Primary Examiner* — Nicholas Klicos
(74) *Attorney, Agent, or Firm* — Polsinelli PC

(57) ABSTRACT

Disclosed are systems, methods, and computer-readable storage media for adjusting features of an audio signal using a graphical user interface. The graphical user interface displays representations of a group of audio output devices with each representation positioned a distance away from a center point. The graphical user interface is interactive and responds to input gestures from a user including a selection gesture for selecting a representation of a particular audio output device and a slide gesture for moving the selected representation relative to the center point. Based on a degree of motion of the slide gesture, a feature of the audio signal is adjusted.

20 Claims, 12 Drawing Sheets

(56) References Cited

U.S. PATENT DOCUMENTS

| | | | |
|---|---|---|---|
| 2010/0299639 A1* | 11/2010 | Ramsay | G06F 3/0486 |
| | | | 715/835 |
| 2012/0057710 A1* | 3/2012 | Disch | H04S 7/30 |
| | | | 381/22 |
| 2012/0113224 A1* | 5/2012 | Nguyen | G06K 9/0057 |
| | | | 348/46 |
| 2012/0195433 A1* | 8/2012 | Eppolito | H04S 3/008 |
| | | | 381/1 |
| 2013/0305152 A1* | 11/2013 | Griffiths | G06F 3/04883 |
| | | | 715/716 |
| 2014/0037107 A1* | 2/2014 | Marino, Jr. | H03G 3/10 |
| | | | 381/107 |
| 2015/0098596 A1* | 4/2015 | Noah | H04S 7/301 |
| | | | 381/303 |
| 2015/0215722 A1* | 7/2015 | Milne | H04S 7/305 |
| | | | 381/300 |
| 2015/0293655 A1* | 10/2015 | Tan | G06F 3/0486 |
| | | | 715/727 |
| 2015/0382128 A1* | 12/2015 | Ridihalgh | H04S 7/301 |
| | | | 381/57 |
| 2016/0092072 A1* | 3/2016 | So | G06F 3/04883 |
| | | | 345/173 |
| 2017/0013386 A1* | 1/2017 | Vautin | H04S 3/008 |
| 2017/0019745 A1* | 1/2017 | Lee | H04R 3/005 |
| 2017/0185373 A1* | 6/2017 | Kim | G06F 3/0482 |
| 2017/0195819 A1* | 7/2017 | Harder | H04S 3/008 |

* cited by examiner

US 10,901,681 B1

VISUAL AUDIO CONTROL

TECHNICAL FIELD

The present technology pertains to controlling audio features of an audio signal; and more specifically to a user interface for adjusting individual characteristics of each of multiple audio channels.

BACKGROUND

Audio signals can be encoded with multiple audio components such as surround sound delivery systems. However, adjusting volume of a surround sound audio system applies a volume adjustment to all audio output devices to the same degree. Also, audio signals can be encoded with multiple tracks, such as a primary language track and one or more alternative language tracks. However, known audio systems allow only the selection of a single track through a receiver interface or remote controller menu interface and the audio system outputs the single selected audio track on each of the connected audio output devices.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Disclosed are systems, methods, and computer-readable storage media for adjusting features of an audio signal using a graphical user interface. The graphical user interface displays representations of a group of audio output devices with each representation positioned a distance away from a center point. The graphical user interface is interactive and responds to input gestures from a user including a selection gesture for selecting a representation of a particular audio output device and a slide gesture for moving the selected representation relative to the center point. Based on a degree of motion of the slide gesture, a feature of the audio signal is adjusted.

Example Embodiments

The present technology involves systems, methods, and computer-readable media for adjusting features of audio signals using a graphical user interface (GUI).

Figure 1A:
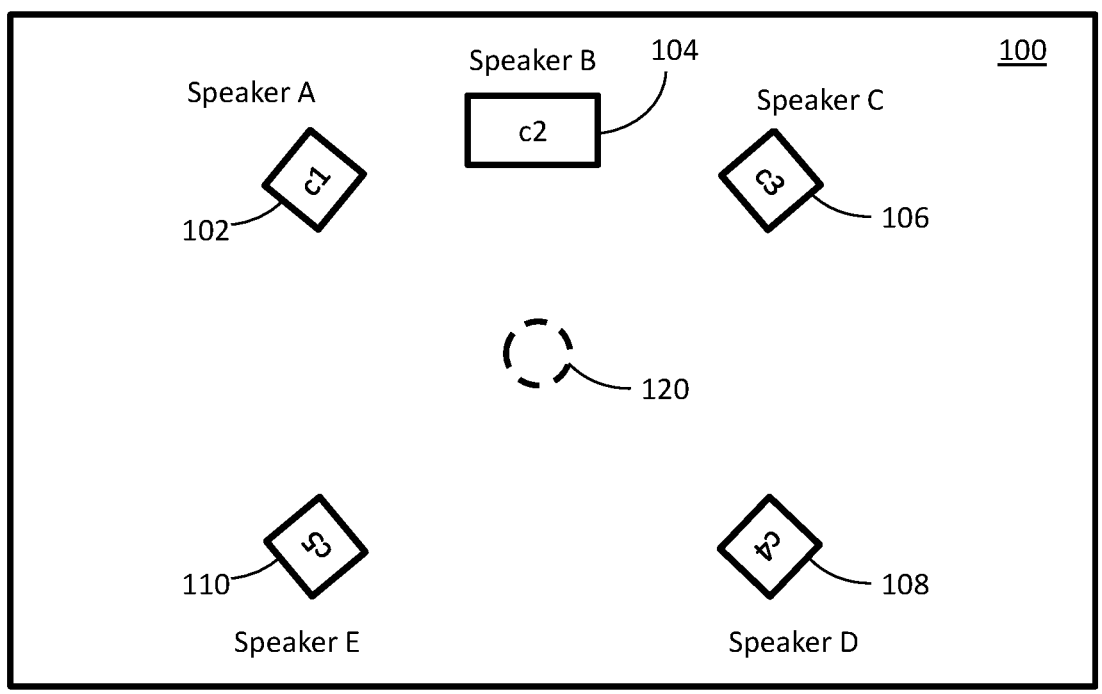
FIG. 1A illustrates a graphical user interface displaying a representation of a plurality of audio output devices.

FIG. 1A illustrates a graphical user interface 100 displaying a representation of a plurality of audio output devices: Speaker A 102, Speaker B 104, Speaker C 106, Speaker D 108, and Speaker E 110. The plurality of audio output devices are communicatively coupled with an audio source (not shown) and the audio source transmits an audio signal to the plurality of audio output devices.

Audio content and audio components of audiovisual content can be encoded with various features including a plurality of channel components, a plurality of audio tracks, etc. For example, an audio signal can be encoded as a plurality of channel components mapped to one or more audio output device in a surround sound audio delivery technique. In another example, an audio signal can be encoded as a plurality of audio tracks (e.g. discreet audio feeds from an event, discreet audio feeds from one component of a musical performance, etc.) and each of the plurality of the audio tracks can be configured to be outputted by separate audio output devices in an arrangement of a plurality of audio output devices.

FIG. 1A illustrates the plurality of audio output devices outputting separate channel components of an audio signal. As shown, Speaker A 102 outputs component c1, Speaker B 104 outputs component c2, Speaker C 106 outputs component c3, Speaker D 108 outputs component c4, and Speaker E 110 outputs component c5. In some cases the channel components are surround sound audio components. For example, channel component c1 can be mapped to a "Front Left" component, c2 can be mapped to a "Center" component, c3 can be mapped to a "Front Right" component, c4 can be mapped to a "Surround Right" component, and c5 can be mapped to a "Surround Left" component. Although one example channel component mapping is described explicitly herein, those with ordinary skill in the art having the benefit of the present disclosure will readily appreciate that the technology described herein can be used for wide variety of audio output device arrangements now known or later developed.

The graphical user interface 100 shows each of the representations of Speaker A 102, Speaker B 104, Speaker C 106, Speaker D 108, and Speaker E 110 at a distance from a virtual center point 120. Further, each representation of Speaker A 102, Speaker B 104, Speaker C 106, Speaker D 108, and Speaker E 110 are interactive through a user entering input gestures through the graphical user interface 100. For example, the graphical user interface 100 can be executed by a computer coupled with a pointing device such as a computer mouse, trackpad, etc. Also, the graphical user interface 100 can be executed on a computer associated with a touch-sensitive display capable of receiving touch gestures. For example, in some cases, the representations of Speaker A 102, Speaker B 104, Speaker C 106, Speaker D 108, and Speaker E 110 can be selected by a selection gesture, e.g. a mouse press and hold, a one-finger press and hold on the representation through a touch-sensitive display, etc. Also, once selected, a representation of each of Speaker A 102, Speaker B 104, Speaker C 106, Speaker D 108, and Speaker E 110 can be move towards and away from the virtual center point 120 using a slide gesture, e.g. moving the mouse while keeping a button held, moving a finger after a one-finger press and hold.

Figure 1B:
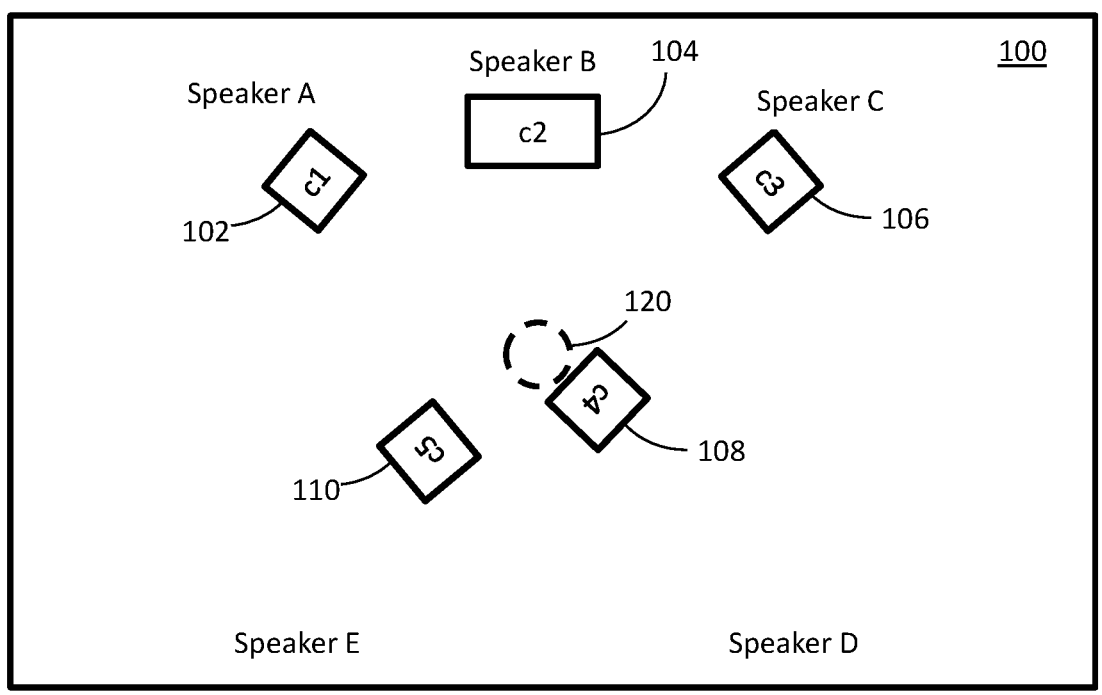
FIG. 1B illustrates the graphical user interface after receiving input gestures to adjust volume of audio output devices.

An application executing the graphical user interface 100 can translate the input gestures into instructions for adjusting a feature of an audio signal being output by one or more of the audio output devices. In some cases, the graphical user interface 100 can be used to adjust a feature of an audio signal based on a degree of movement of representation of an audio output device after receiving slide gesture. For example, a slide gesture can linearly adjust the volume of the channel component associated with a particular representation of an audio output device receiving the slide gesture. More specifically, in some cases a minimum volume can be specified for a channel component when the representation of a particular audio device is closest to the virtual center point 120 and a maximum volume can be specified for the channel component when the representation of the particular audio device is furthest from the virtual center point 120. FIG. 1B illustrates the graphical user interface 100 after receiving input gestures to adjust the volume for the "Surround Right" component c4 associated with Speaker D 108 and the "Surround Left" component c5 associated with Speaker E 110. In this case, the volume for the "Surround Right" component c4 is effectively muted through the representation of Speaker D 108 being slid to the center point 120. Also, the volume for the "Surround Left" component c5 is adjusted to approximately fifty percent of the maximum volume by virtue of the representation of Speaker E 112 being slid halfway towards the virtual center point 120.

Figure 1C:
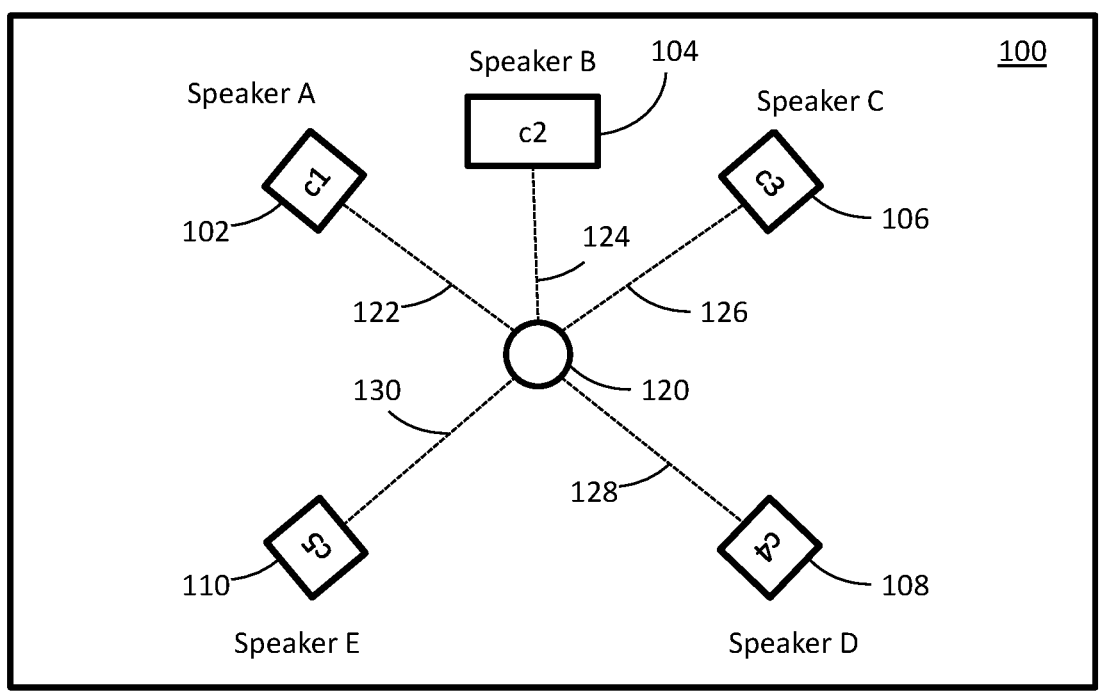
FIG. 1C illustrates a graphical user interface displaying a representation of a plurality of audio output devices.

In some cases, axes are displayed on the graphical user interface 100 or functionally used in guiding input gestures. FIG. 1C illustrates the graphical user interface 100 displaying the representation of a plurality of audio output devices: Speaker A 102, Speaker B 104, Speaker C 106, Speaker D 108, and Speaker E 110. The graphical user interface 100 also includes a center point 120 and a plurality of axes 122, 124, 126, 128, 130 associated with each of the representations of Speaker A 102, Speaker B 104, Speaker C 106, Speaker D 108, and Speaker E 110, respectively. Additionally, each representation of Speaker A 102, Speaker B 104, Speaker C 106, Speaker D 108, and Speaker E 110 are interactive through a user entering input gestures through the graphical user interface 100. For example, the graphical user interface 100 can be executed by a computer coupled with a pointing device such as a computer mouse, trackpad, etc. Also, the graphical user interface 100 can be executed on a computer associated with a touch-sensitive display capable of receiving touch gestures.

As shown, the plurality of axes 122, 124, 126, 128, 130 are displayed in the graphical user interface 100. In some cases, the axes 122, 124, 126, 128, 130 are associated with the audio output devices, but not actually visually displayed in the graphical user interface 100. Also, in some cases, the representations of the audio output devices are distributed in discrete arcs around a center point, but not necessarily tied to an axis. Additionally, although specific examples of audio output device layouts are described explicitly, those with ordinary skill in the art having the benefit of the disclosure will readily appreciate that a wide variety of graphical user interface layouts can benefit from the present technology.

In some cases, the representations of Speaker A 102, Speaker B 104, Speaker C 106, Speaker D 108, and Speaker E 110 can be selected by a selection gesture, e.g. a mouse press and hold, a one-finger press and hold on the representation through a touch-sensitive display, etc. Also, once selected, a representation of each of Speaker A 102, Speaker B 104, Speaker C 106, Speaker D 108, and Speaker E 110 can be move along an associated axis using a slide gesture, e.g. moving the mouse while keeping a button held, moving a finger after a one-finger press and hold.

Figure 1D:
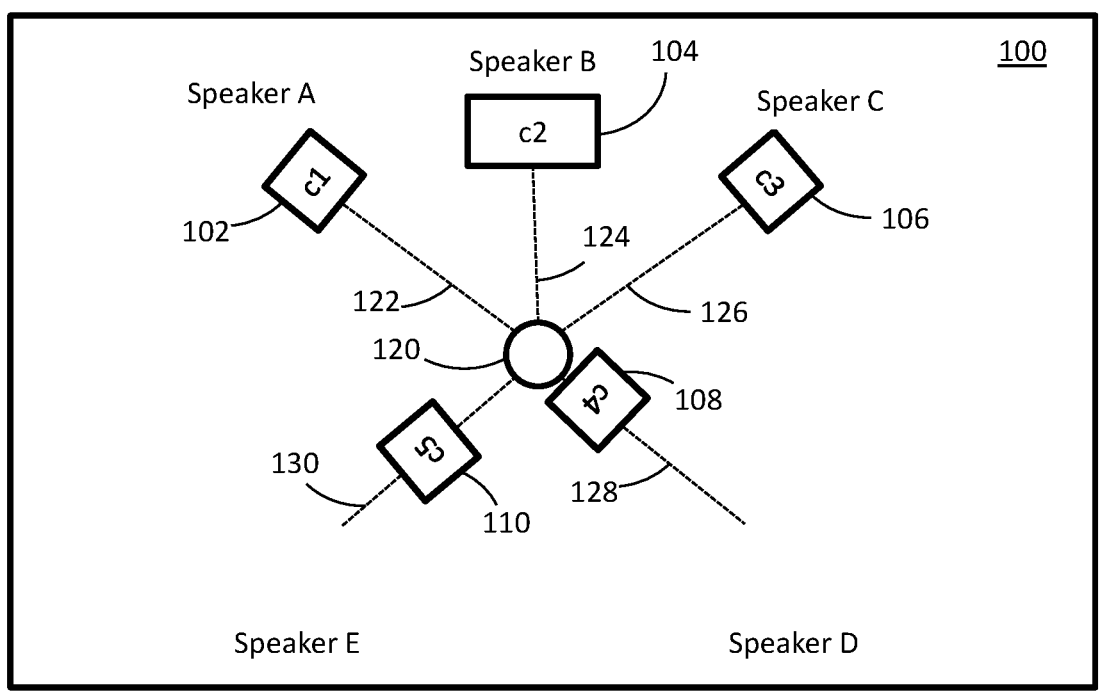
FIG. 1D illustrates the graphical user interface after receiving input gestures to adjust volume of audio output devices.

An application executing the graphical user interface 100 can translate the input gestures into instructions for adjusting a feature of an audio signal being output by one or more of the audio output devices. In some cases, the graphical user interface 100 can be used to adjust a feature of an audio signal based on a degree of movement of representation of an audio output device after receiving slide gesture along an axis. For example, a slide gesture can linearly adjust the volume of the channel component associated with a particular representation of an audio output device receiving the slide gesture. More specifically, in some cases a minimum volume can be specified for a channel component when the representation of a particular audio device is closest to the center point and a maximum volume can be specified for the channel component when the representation of the particular audio device is closest to a terminal end of the axis. FIG. 1D illustrates the graphical user interface 100 after receiving input gestures to adjust the volume for the "Surround Right" component c4 associated with Speaker D 108 and the "Surround Left" component c5 associated with Speaker E 110. In this case, the volume for the "Surround Right" component c4 is effectively muted through the representation of Speaker D 108 being slid along axis 128 to the center point 120. Also, the volume for the "Surround Left" component c5 is adjusted to approximately fifty percent of the maximum volume by virtue of the representation of Speaker E 112 being slid along axis 130 to its halfway point.

Figure 2:
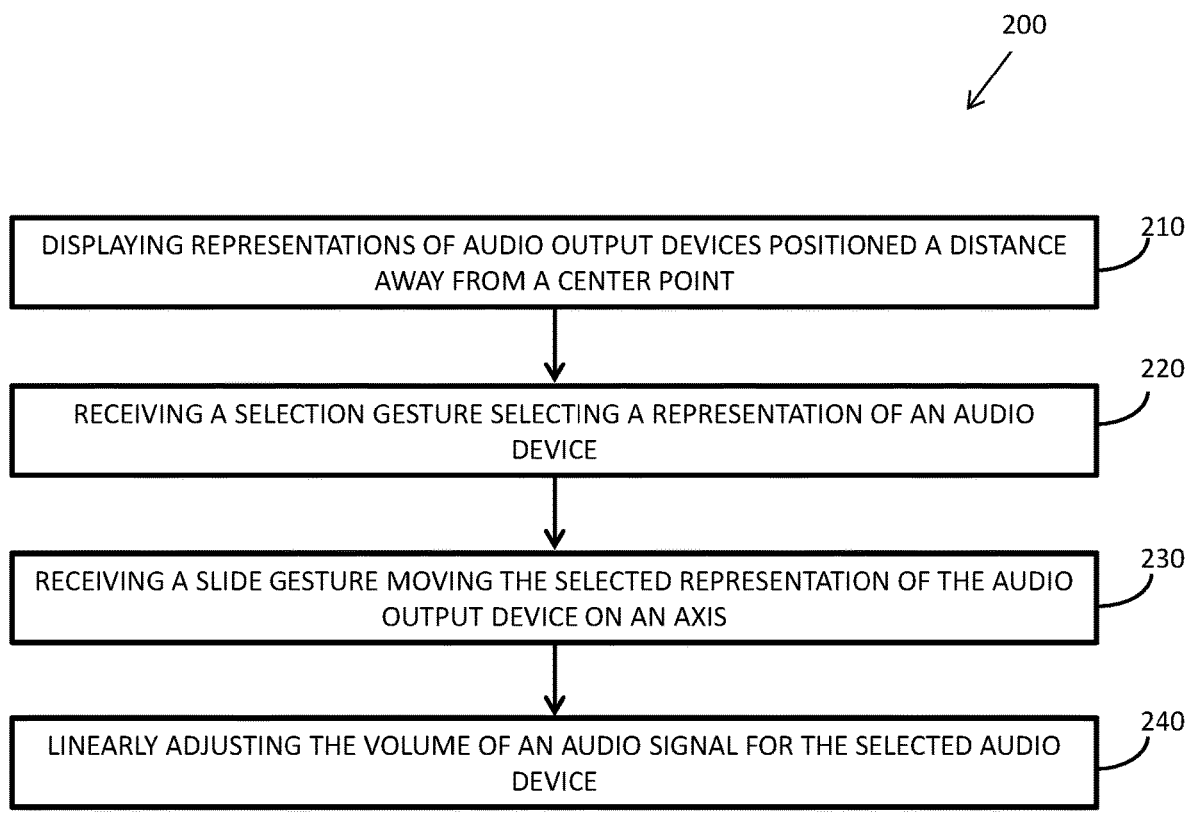
FIG. 2 illustrates a method of adjusting an audio signal.

FIG. 2 illustrates a method 200 of adjusting an audio signal. The method 200 involves displaying representations of audio output devices positioned a distance away from a center point 210 and receiving a selection gesture selecting a representation of an audio device 220. Next, the method 200 involves receiving a slide gesture moving the selected representation of the audio output device on an axis 230 and linearly adjusting the volume of an audio signal for the selected audio device 240.

In addition to controlling volume of an audio signal, various other features of audio signals can be controlled by various input gestures. In some cases, an audio signal is recorded, mixed, broadcast, streamed, etc. with a plurality of audio tracks. For example, the audio signal for a sporting event can be encoded with an audio track for a national television broadcast, an audio track of a radio broadcast from each teams competing, an audio track for the in-game audio (e.g. ice-level game sound for an ice hockey game), and one or more audio tracks of sound from a microphone attached to a player, etc. In another example, an audio signal of a musical arrangement can include audio tracks for isolated components of the arrangement, e.g. isolated guitars, drums, vocals.

In cases of an audio signal with a plurality of audio tracks, a graphical user interface can be used to control features of the audio tracks, control which audio output device outputs the audio tracks, etc.

Figure 3A:
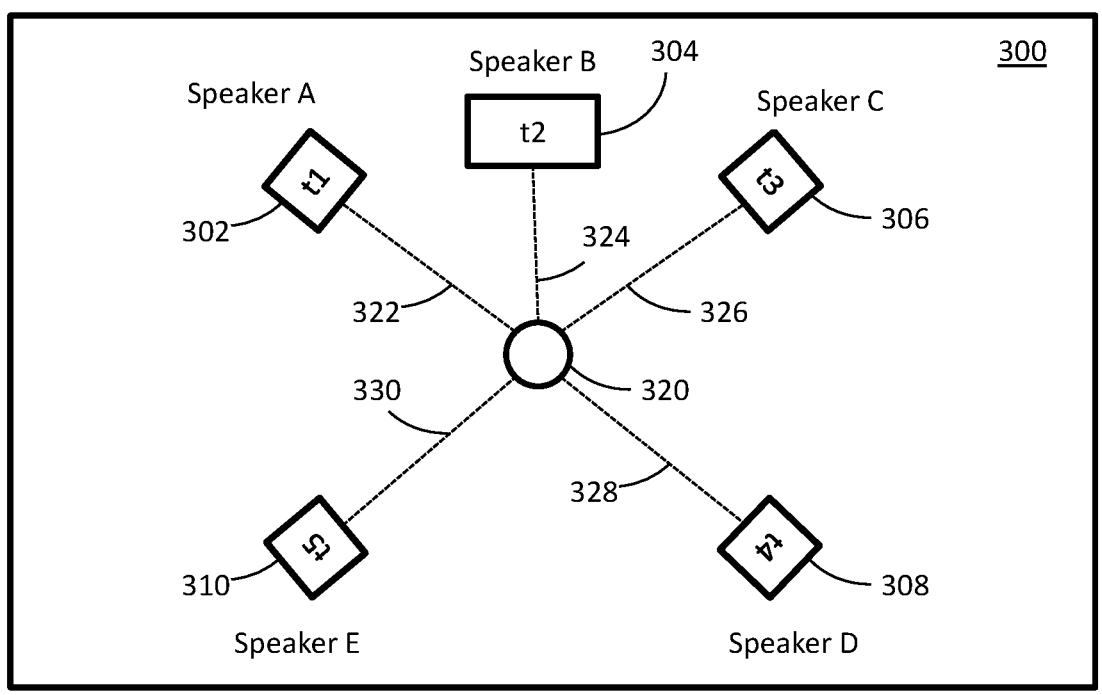
FIG. 3A illustrates a graphical user interface with representations of a plurality of audio output devices outputting separate audio tracks encoded in an audio signal.

FIG. 3A illustrates a graphical user interface 300 with representation of a plurality of audio output devices outputting separate audio tracks encoded in an audio signal. As shown, Speaker A 302 outputs track t1, Speaker B 304 outputs track t2, Speaker C 306 outputs track t3, Speaker D 308 outputs track t4, and Speaker E 310 outputs track t5. For example, the audio tracks can be separate audio tracks from a sporting event with track t1 being an Away Team radio broadcast, track t2 being a Home Team radio broadcast, track t3 being a Home Team player Number 16 microphone, track t4 being an Away Team number 99 microphone, and track t5 being the National Television broadcast commentary. Those with ordinary skill in the art having the benefit of the present disclosure will readily appreciate that the technology described herein can be used for wide variety of other audio track combinations.

The graphical user interface 300 also includes a center point 320 and a plurality of axes 322, 324, 326, 328, 330 associated with each of the representations of Speaker A 302, Speaker B 304, Speaker C 306, Speaker D 308, and Speaker E 310, respectively. Additionally, each representation of Speaker A 302, Speaker B 304, Speaker C 306, Speaker D 308, and Speaker E 310 are interactive through a user entering input gestures through the graphical user interface 300.

In some cases, the representations of Speaker A 302, Speaker B 304, Speaker C 306, Speaker D 308, and Speaker E 310 can be selected by a selection gesture, e.g. a mouse press and hold, a one-finger press and hold on the representation through a touch-sensitive display, etc. Also, once selected, a representation of each of Speaker A 302, Speaker B 304, Speaker C 306, Speaker D 308, and Speaker E 310 can be move along an associated axis using a slide gesture, e.g. moving the mouse while keeping a button held, moving a finger after a one-finger press and hold.

Figure 3B:
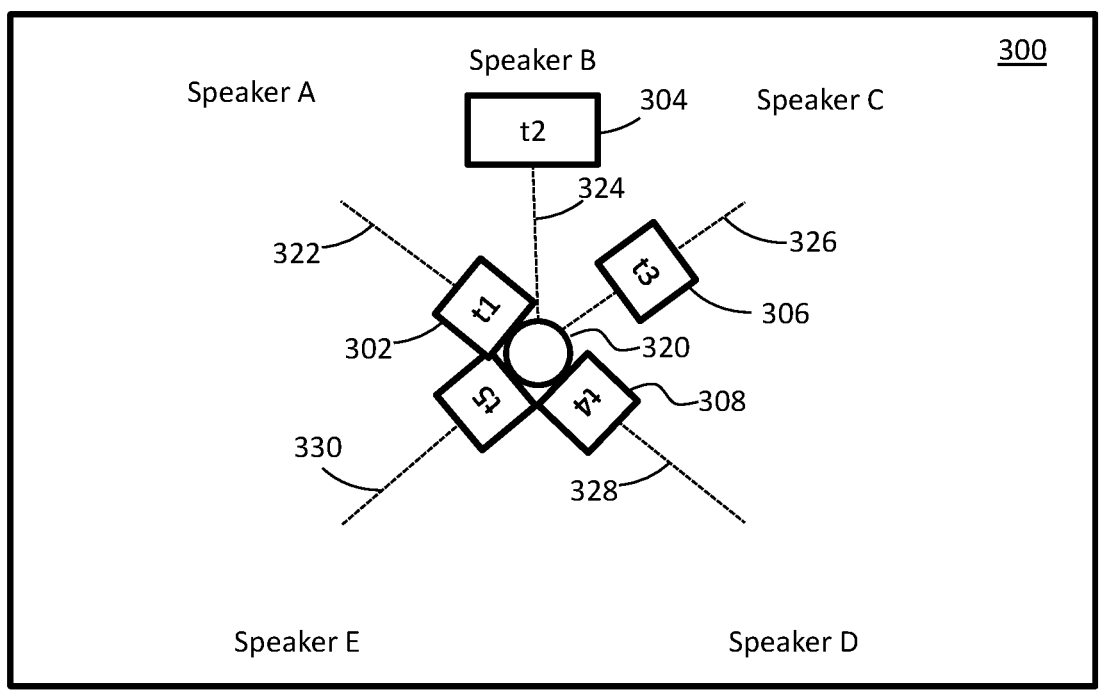
FIG. 3B illustrates the graphical user interface after receiving input gestures to adjust the volume for separate audio tracks.

An application executing the graphical user interface 300 can translate the input gestures into instructions for adjusting a feature of an audio signal being output by one or more of the audio output devices. In some cases, a slide gesture can linearly adjust the volume of the audio track associated with a particular representation of an audio output device receiving the slide gesture. For example, a minimum volume can be specified for an audio track when the representation of a particular audio device is closest to the center point and a maximum volume can be specified for the audio track when the representation of the particular audio device is closest to a terminal end of the axis. FIG. 3B illustrates the graphical user interface 300 after receiving input gestures to adjust the volume for track t1 Away Team radio broadcast, track t3 Home Team player Number 16 microphone, track t4 Away Team number 99 microphone, and track t5 National Television broadcast commentary. In this case, the volume for track t1 Away Team radio broadcast, track t4 Away Team number 99 microphone, and track t5 National Television broadcast commentary are effectively muted. Also, the volume for track t3 Home Team player Number 16 microphone is reduced to approximately fifty percent of the maximum volume by virtue of the representation of Speaker E 312 being slid along axis 330 to its halfway point while the volume for track t2 Home Team radio broadcast is maintained at a maximum volume.

In some cases, a graphical user interface displays a representation of each track for an audio signal containing multiple tracks. The representations can receive selection inputs and slide gestures that adjust the volume of each individual track. Based on the respective volume for each track, all of the tracks can be mixed into a single output that can be output by each audio output device in an audio system.

Figure 3C:
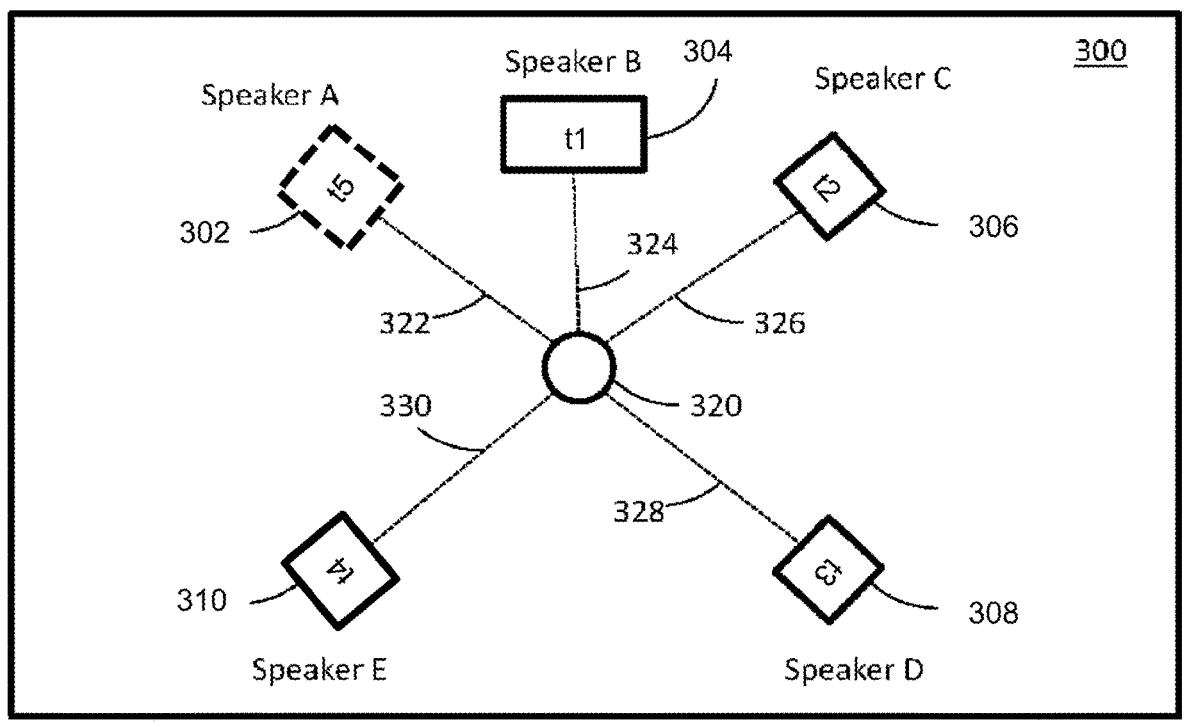
FIG. 3C illustrates the graphical user interface after a user performs a rotational gesture.

In addition to selection and slide gestures, a wide variety of other gestures can control aspects of an audio signal. For example, on a touch-sensitive display a two-finger rotational gesture can cause the audio tracks to move to new representations of the audio output devices can cause a change to the assignments of audio tracks to the audio output devices. FIG. 3C illustrates the graphical user interface 300 of FIG. 3A after a user performs a rotational gesture. As shown, track t1 Away Team radio broadcast moved to Speaker B 304, track t2 Home Team radio broadcast moved to Speaker C 306, track t3 Home Team player Number 16 microphone moved to Speaker D 308, track t4 Away Team number 99 microphone moved to Speaker E 310, and track t5 National Television broadcast commentary moved to Speaker A 302.

In some cases, a rotation gesture can be required to exceed a predetermined threshold degree of rotation before causing the audio tracks to move to a new audio output device. For example, a full three-hundred sixty degree arc can be divided by the number of axes represented in a GUI and the product can be the basis for a predetermined threshold degree of rotation. More specifically, in the case of five axes, a seventy-two degree rotation can be required before causing the audio tracks to move to a neighboring audio output device while a rotation of one-hundred forty-four degree will cause the audio tracks to move two spots. Similarly, the predetermined threshold degree of rotation can include a range of rotations that will effectuate a rotation. For example, in the case of five axes, a range of sixty degrees to eighty-four degrees can be required before causing the audio tracks to move to a neighboring audio output device. Although specific examples are described herein, those with ordinary skill in the art having the benefit of the present disclosure will readily appreciate that a wide range of rotation gestures, thresholds, etc. can be used to effect adjustment of audio features.

As explained above, a selection gesture can include a mouse click, a finger-tap, etc. However, in some cases a protracted selection gesture can be interpreted as another type of input. For example, a selection gesture that exceeds a predetermined threshold temporal length before a slide gesture is commenced can be interpreted as a protracted selection gesture. In some cases, a protracted selection gesture can be used to "pick up" an audio feature to allow a user to move the audio feature to another audio output device.

Figure 4A:
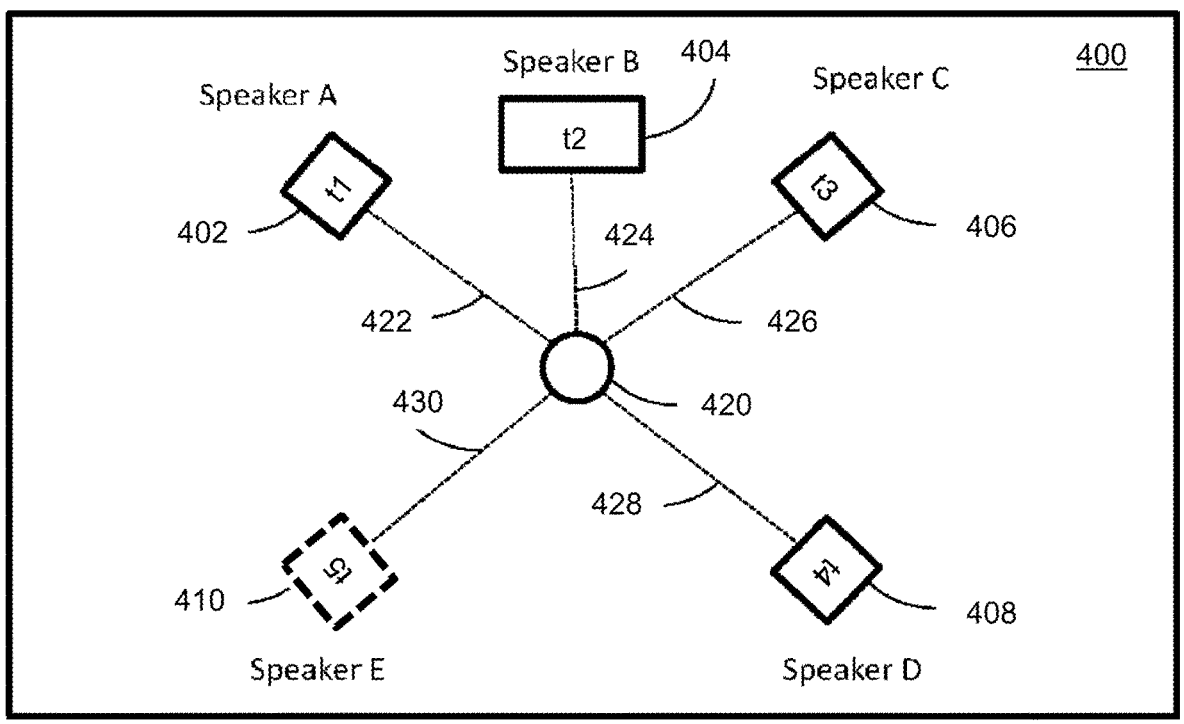
FIG. 4A illustrates a graphical user interface with representations of a plurality of audio output devices outputting separate audio tracks encoded in an audio signal.

FIG. 4A illustrates a graphical user interface 400 with representation of a plurality of audio output devices outputting separate audio tracks encoded in an audio signal. As shown, Speaker A 402 outputs track t1, Speaker B 404 outputs track t2, Speaker C 406 outputs track t3, Speaker D 408 outputs track t4, and Speaker E 410 outputs track t5. The graphical user interface 400 also includes a center point 420 and a plurality of axes 422, 424, 426, 428, 430.

The representations of Speaker A 402, Speaker B 404, Speaker C 406, Speaker D 408, and Speaker E 410 can be selected by a protracted selection gesture, e.g. a mouse press and hold lasting longer than a predetermined temporal threshold or a one-finger press and hold on the representation through a touch-sensitive display lasting longer than a predetermined temporal threshold, etc. A protracted selection gesture can cause the representations of the Speakers to appear to become "picked up" by rendering the representation to appear to be above the plane of the graphical user interface 400. As shown in FIG. 4A a protracted selection gesture caused Speaker E 410 to be "picked up."

Figure 4B:
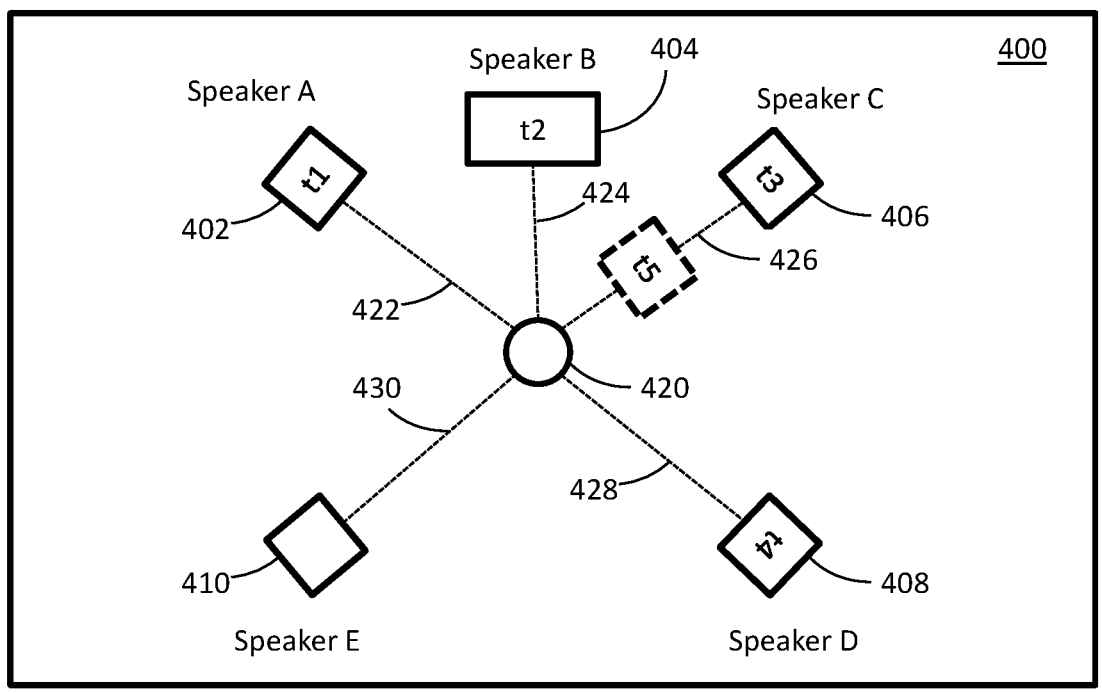
FIG. 4B illustrates the graphical user interface after a protracted selection gesture.

Once "picked up", a sustained selection and slide gesture (e.g. maintaining the mouse click or one-finger press while moving the mouse pointer or finger over the graphical user interface) can cause the representation to follow the motion of the slide gesture. Also, a sustained selection and slide gesture can be used to move a representation of an audio output device to a different axis. FIG. 4B illustrates the graphical user interface 400 after a protracted selection gesture is used to "pick up" the representation of Speaker E 410 and a sustained selection and slide gesture is used to move the representation of Speaker E 410 to axis 426. In some cases, a replacement representation 410' of Speaker E can take the place of a moved representation of an audio output device. Additionally, upon release of the sustained selection and slide gesture over a new axis, the representation of Speaker E 410 can be dropped on the new axis.

When a representation of an audio output device is moved to a new axis, an audio feature being output from the previous audio output device can be moved to the audio output device associated with the new axis. For example, in FIG. 4B, track t5 can be moved to Speaker C 406. In some cases, an audio feature being output from an audio output device represented on an axis that is the target of a sustained selection and slide gesture to the axis can be swapped to the source axis. For example, in FIG. 4B, track t3 can swap with track t5 and move to the audio output device associated with the representation of Speaker E 410. In some cases, an audio feature that is moved to a new axis with a sustained selection and slide gesture can be combined with an audio feature already being output by the audio output device associated with the target axis. For example, in FIG. 4B, track t3 can be combined with track t5 upon release of the sustained selection and slide gesture. In some other cases, the release of a sustained selection and slide gesture can cause the graphical user interface 400 to display a menu that prompts a user to select an option for explicitly specifying how the audio features should be output in response to the sustained selection and slide gesture.

As explained above, audio signals can be encoded as a combination of multiple audio streams into one container in a way that all streams to be received together. In these cases, a media device (e.g. a receiver) can receive the encoded signal and generate a graphical user interface adjusting the audio features (e.g. components, tracks, etc.) encoded in the audio signal. However, other media content can be associated with a plurality of isolated audio signals. For example, a sporting event can be broadcast with only the national syndicated audio stream. However, other audio signals can be separately created for the event, e.g. local radio broadcast audio, foreign language audio commentary, etc. Accordingly, some embodiments of the present technology involve systems, methods, and computer-readable media for receiving multiple audio signals, assigning audio features from the multiple audio signals to audio output devices, and generating a graphical user interface for adjusting the audio features. Also, some embodiments involve systems, methods, and computer-readable media for receiving multiple audio signals, multiplexing the audio signals into a spatially-aware, multi-channel format, and delivering the multi-channel format to an application for generating a graphical user interface for adjusting the audio features.

As explained herein, audio features of an audio signal can be adjusted and controlled using graphical user interfaces and input gestures. However, the graphical user interfaces and input gestures described herein can also be used to control a wide variety of other connected devices. For example, lighting features (brightness, color, timers, etc.) of connected lighting elements can be similarly controlled. Similarly, security settings (notification volume, motion sensitivity, etc.) of security system elements can be similarly controlled.

Figure 5A:
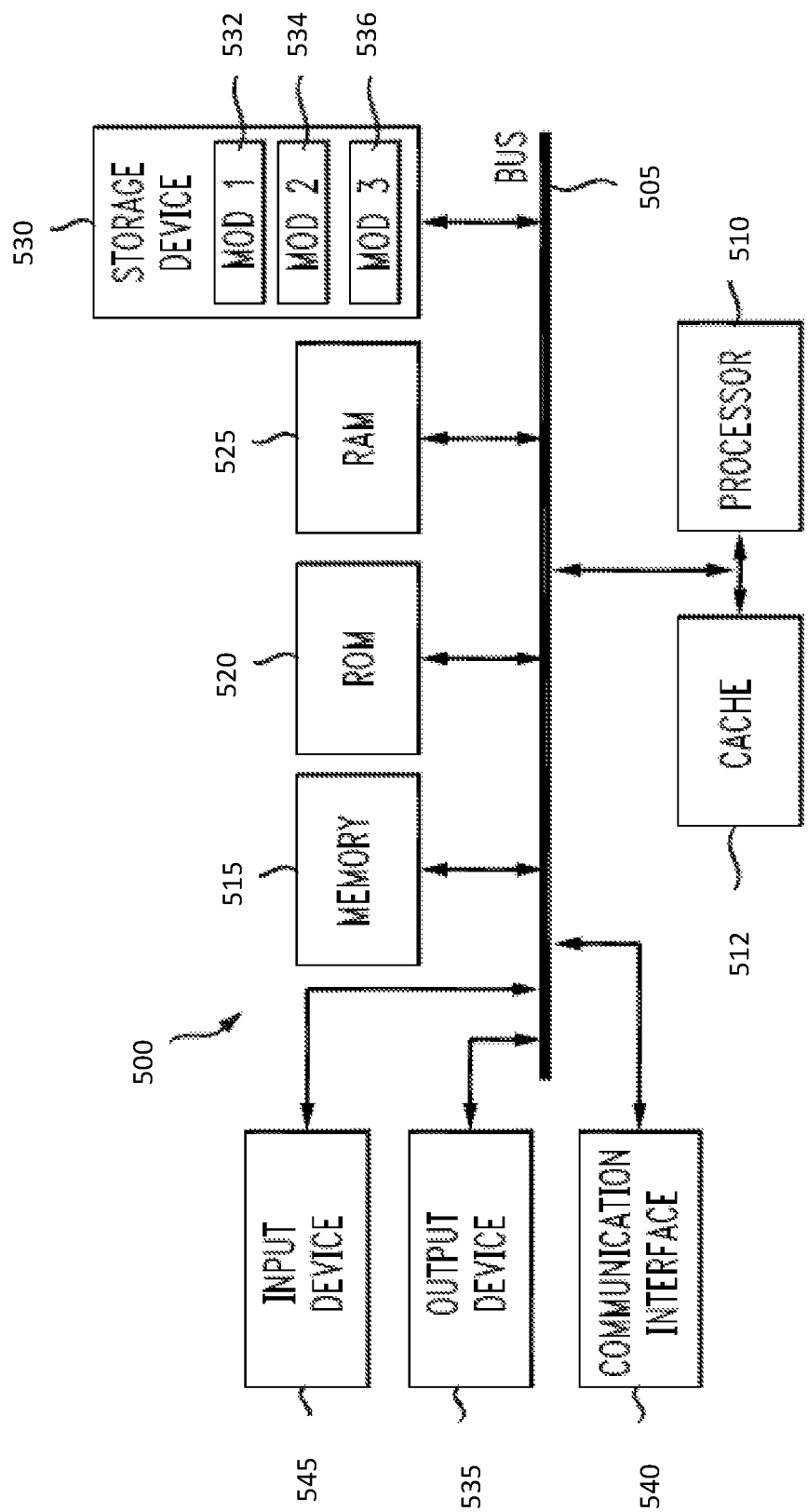
FIG. 5A and FIG. 5B illustrate example system embodiments.
Figure 5B:
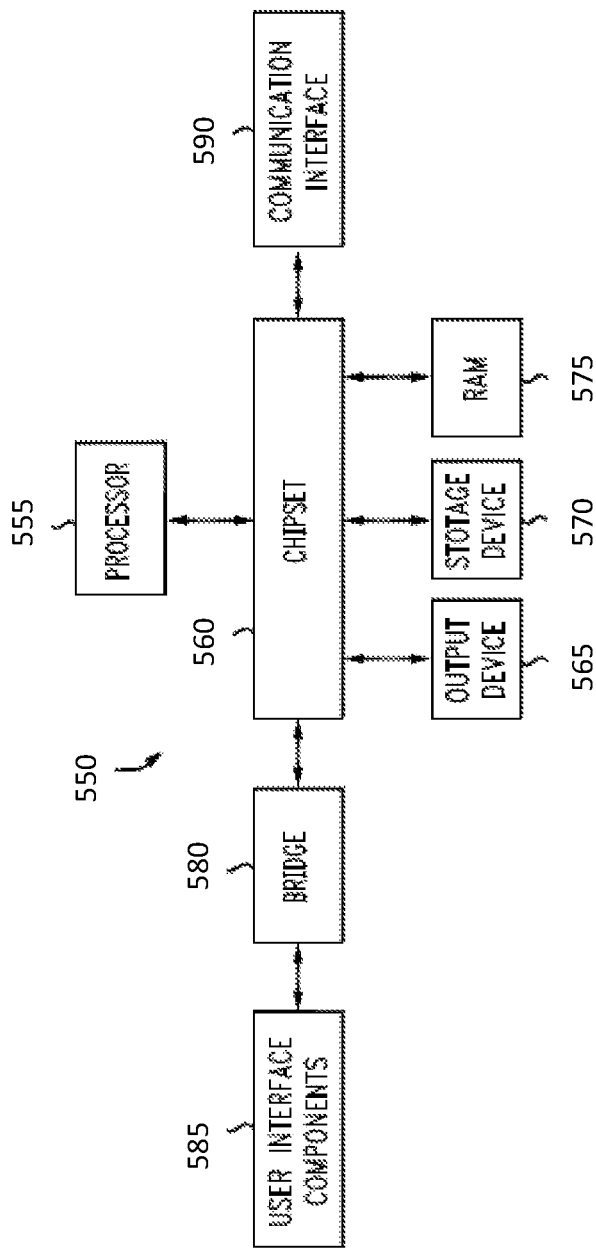

FIG. 5A and FIG. 5B illustrate example system embodiments. The more appropriate embodiment will be apparent to those of ordinary skill in the art when practicing the present technology. Persons of ordinary skill in the art will also readily appreciate that other system embodiments are possible.

FIG. 5A illustrates a conventional system bus computing system architecture 500 wherein the components of the system are in electrical communication with each other using a bus 505. Exemplary system 500 includes a processing unit (CPU or processor) 510 and a system bus 505 that couples various system components including the system memory 515, such as read only memory (ROM) 570 and random access memory (RAM) 575, to the processor 510. The system 500 can include a cache of high-speed memory connected directly with, in close proximity to, or integrated as part of the processor 510. The system 500 can copy data from the memory 515 and/or the storage device 530 to the cache 517 for quick access by the processor 510. In this way, the cache can provide a performance boost that avoids processor 510 delays while waiting for data. These and other modules can control or be configured to control the processor 510 to perform various actions. Other system memory 515 may be available for use as well. The memory 515 can include multiple different types of memory with different performance characteristics. The processor 510 can include any general purpose processor and a hardware module or software module, such as module 1 537, module 7 534, and module 3 536 stored in storage device 530, configured to control the processor 510 as well as a special-purpose processor where software instructions are incorporated into the actual processor design. The processor 510 may essentially be a completely self-contained computing system, containing multiple cores or processors, a bus, memory controller, cache, etc. A multi-core processor may be symmetric or asymmetric.

To enable user interaction with the computing device 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing device 500. The communications interface 540 can generally govern and manage the user input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 575, read only memory (ROM) 570, and hybrids thereof.

The storage device 530 can include software modules 537, 534, 536 for controlling the processor 510. Other hardware or software modules are contemplated. The storage device 530 can be connected to the system bus 505. In one aspect, a hardware module that performs a particular function can include the software component stored in a computer-readable medium in connection with the necessary hardware components, such as the processor 510, bus 505, display 535, and so forth, to carry out the function.

FIG. 5B illustrates an example computer system 550 having a chipset architecture that can be used in executing the described method and generating and displaying a graphical user interface (GUI). Computer system 550 is an example of computer hardware, software, and firmware that can be used to implement the disclosed technology. System 550 can include a processor 555, representative of any number of physically and/or logically distinct resources capable of executing software, firmware, and hardware configured to perform identified computations. Processor 555 can communicate with a chipset 560 that can control input to and output from processor 555. In this example, chipset 560 outputs information to output 565, such as a display, and can read and write information to storage device 570, which can include magnetic media, and solid state media, for example. Chipset 560 can also read data from and write data to RAM 575. A bridge 580 for interfacing with a variety of user interface components 585 can be provided for interfacing with chipset 560. Such user interface components 585 can include a keyboard, a microphone, touch detection and processing circuitry, a pointing device, such as a mouse, and so on. In general, inputs to system 550 can come from any of a variety of sources, machine generated and/or human generated.

Chipset 560 can also interface with one or more communication interfaces 590 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 555 analyzing data stored in storage 570 or 575. Further, the machine can receive inputs from a user via user interface components 585 and execute appropriate functions, such as browsing functions by interpreting these inputs using processor 555.

It can be appreciated that example systems 500 and 550 can have more than one processor 510 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

What is claimed is:

1. A computer-implemented method comprising:
    displaying, at a graphical user interface of a system, a plurality of representations of a plurality of audio components outputted by a plurality of audio output devices, each representation positioned, along an axis, a distance from a center point;
    receiving, at the system, a selection gesture on a first representation;
    in response to the selection gesture, selecting, at the graphical user interface, the first representation of the plurality of representations of the plurality of audio components outputted by a first audio output device of the plurality of audio output devices;
    receiving, at the system, a slide gesture on the first representation;

in response to the slide gesture, changing, at the graphical user interface, the distance, along the axis, of the first representation relative to the center point in a direction of the slide gesture;

in response to determining a change in the distance of the first representation relative to the center point and that the first representation represents one or more channel components of a multi-channel audio signal, adjusting a feature of the first audio output device based on the distance of the first representation relative to the center point.

2. The computer-implemented method of claim 1, wherein adjusting the feature of the first audio output device further comprises linearly adjusting a volume of the first audio output device with a minimum volume reached when the first representation is closest to the center point and a maximum volume reached when the first representation is closest to a terminal point away from the center point.

3. The computer-implemented method of claim 1, further comprising:

receiving a rotation gesture moving each representation of the plurality of audio components to a new position around the center point based on a degree of rotation; and adjusting a second feature of a second audio signal outputted by a second audio output device of the plurality of audio output devices.

4. The computer-implemented method of claim 1, further comprising:

outputting each channel of the multi-channel audio signal using one audio output device of the plurality of audio output devices.

5. The computer-implemented method of claim 4, wherein the plurality of audio output devices are used in a surround sound audio delivery system.

6. The computer-implemented method of claim 1, further comprising:

outputting each audio track of the multi-track audio signal by one audio output device of the plurality of audio output devices.

7. The computer-implemented method of claim 6, wherein each audio track of the multi-track audio signal comprises a discrete audio feed from an event.

8. The computer-implemented method of claim 6, wherein each audio track of the multi-track audio signal comprises a discrete audio feed from one component of a musical performance.

9. The computer-implemented method of claim 6, further comprising:

outputting a first audio track of the multi-track audio signal using the first audio output device, the first audio track represented by the first representation at a first position;

outputting a second audio track of the multi-track audio signal using a second audio output device of the plurality of audio output devices, the second audio track represented by a second representation of the plurality of representations of the plurality of audio components at a second position;

receiving an extended selection gesture for selection of the second representation;

receiving a second slide gesture moving the second representation from the second position to the first position; and outputting the second audio track using the first audio output device.

10. The computer-implemented method of claim 9, further comprising:

outputting the first audio track using the second audio output device or a third audio output device of the plurality of audio output devices.

11. The computer-implemented method of claim 9, further comprising:

outputting a mixed audio track of the first audio track and the second audio track using the first audio output device.

12. The computer-implemented method of claim 9, wherein the selection gesture comprises a touch input on a touch-sensitive display having a temporal length less than a predetermined threshold length, and wherein the extended selection gesture comprises a touch input on the touch-sensitive display having a temporal length greater than the predetermined threshold length.

13. A system comprising:

a processor; and a computer-readable storage medium having stored therein instructions which, when executed by the processor, cause the processor to:

display, at a graphical user interface, a plurality of representations of a plurality of audio components outputted by a plurality of audio output devices, each representation of the plurality of representations positioned, along an axis, a distance from a center point;

receive a selection gesture on a first representation;

in response to the selection gesture, select, at the graphical user interface, the first representation of the plurality of representations of the plurality of audio components outputted by a first audio output device of the plurality of audio output devices;

receive a slide gesture on the first representation;

in response to the slide gesture, change, at the graphical user interface, the distance, along an axis, of the first representation relative to the center point in a direction of the slide gesture;

in response to determining a change in the distance of the first representation relative to the center point and that the first representation represents one or more audio tracks of a multi-track audio signal, adjust a feature the first audio output device based on the distance of the first representation relative to the center point.

14. The system of claim 13, wherein the instructions that cause the processor to adjust the feature of the first audio output device include further instructions that cause the processor to linearly adjust a volume of the first audio output device with a minimum volume reached when the first representation is closest to the center point and a maximum volume reached when the first representation is closest to a terminal distance away from the center point.

15. The system of claim 13, wherein the instructions further cause the processor to:

receive a rotation gesture moving each representation of the plurality of audio components to a new position around the center point based on a degree of rotation; and adjust a second feature of a second audio signal outputted by a second audio output device of the plurality of audio output devices.

16. The system of claim 13, wherein the instructions further cause the processor to:

output a first audio track of the multi-track audio signal using the first audio output device, the first audio track represented by the first representation at a first position;

output a second audio track of the multi-track audio signal using a second audio output device of the plurality of audio output devices, the second audio track represented by a second representation of the plurality of representations of the plurality of audio components at a second position;

receive an extended selection gesture for selection of the second representation;

receive a second slide gesture moving the second representation from the second position to the first position; and output the second audio track using the first audio output device.

17. A non-transitory computer-readable storage medium having stored therein instructions which, when executed by a processor, cause the processor to:

display, at a graphical user interface, a plurality of representations of a plurality of audio components outputted by a plurality of audio output devices, each representation positioned, along an axis, a distance away from a center point;

receive a selection gesture on a first representation;

in response to the selection gesture, select, at the graphical user interface, the first representation of the plurality of representations of the plurality of audio components outputted by a first audio output device of the plurality of audio output devices;

receive a slide gesture on the first representation;

in response to the slide gesture, change, at the graphical user interface, the distance, along an axis, of the first representation relative to the center point in a direction of the slide gesture;

in response to determining a change in the distance of the first representation relative to the center point and that the first representation represents one or more channel components of a multi-channel audio signal, adjusting a feature of the first audio output device based on the distance of the first representation relative to the center point.

18. The non-transitory computer-readable storage medium of claim 17, wherein the instructions that cause the processor to adjust the feature of the first audio output device include further instructions that cause the processor to linearly adjust a volume of the first audio output device with a minimum volume reached when the first representation is closest to the center point and a maximum volume reached when the first representation is a terminal distance from the center point.

19. The non-transitory computer-readable storage medium of claim 17, wherein the instructions further cause the processor to perform further operations comprising:

receiving a rotation gesture moving each representation of the plurality of audio components to a new position around the center point based on a degree of rotation; and adjusting a second feature of a second audio signal outputted by a second audio output device of the plurality of audio output devices.

20. The non-transitory computer-readable storage medium of claim 17, wherein the instructions further cause the processor to perform further operations comprising:

outputting a first audio track of the multi-track audio signal using the first audio output device, the first audio track represented by the first representation at a first position;

outputting a second audio track of the multi-track audio signal using a second audio output device of the plurality of audio output devices, the second audio track represented by a second representation of the plurality of representations of the plurality of audio components at a second position;

receiving an extended selection gesture for selection of the second representation;

receiving a second slide gesture moving the second representation from the second position to the first position; and outputting the second audio track using the first audio output device.

* * * * *